United States Patent [19]

Susnjara et al.

[11] 4,356,554
[45] Oct. 26, 1982

[54] METHOD AND APPARATUS FOR COMPENSATING FOR SYSTEM ERROR IN AN INDUSTRIAL ROBOT CONTROL

[75] Inventors: Kenneth J. Susnjara, Santa Claus; Michael N. Diamond, Grand View, both of Ind.

[73] Assignee: Thermwood Corporation, Dale, Ind.

[21] Appl. No.: 186,636

[22] Filed: Sep. 12, 1980

[51] Int. Cl.³ .............................................. G05B 19/23
[52] U.S. Cl. .................................... 364/513; 364/170; 364/183; 414/730
[58] Field of Search ............... 364/513, 474, 478, 183, 364/167–171, 191–193; 318/568; 414/730

[56] References Cited

U.S. PATENT DOCUMENTS

| | | | |
|---|---|---|---|
| 3,909,600 | 9/1975 | Hohn | 364/513 |
| 4,021,651 | 5/1977 | Mitsusashi et al. | 364/513 X |
| 4,025,838 | 5/1977 | Watanabe | 364/513 X |
| 4,178,632 | 12/1979 | Anthony | 364/513 |
| 4,283,764 | 8/1981 | Crum et al. | 364/513 |

*Primary Examiner*—Joseph F. Ruggiero

[57] ABSTRACT

An industrial robot and a control system therefor are described. The robot generally consists of a base member, a post member rotatably mounted on the base member, fluid actuated means for rotating the post member relative to the base member, an arm assembly mounted on the post member, means for performing a work function mounted on the arm assembly, fluid actuated means for operating the arm assembly and the work performing means and a system for controlling the operation of the fluid actuated means. A fluid reservoir is provided having a compartment in the post member, and fluid lines intercommunicate the reservoir and the aforementioned fluid actuated means. A motor driven pump mounted on the post member supplies fluid from the reservoir under pressure to the fluid actuated means under the control of electrically operable valves mounted on the post member for that purpose. A control system operates to control the aforementioned hydraulic system by sensing positions of the robot mechanism and comparing those sensed positions with desired positions, information concerning which is in a storage element. The desired and actual positions are compared in a first comparator for producing an error signal which forms a reference signal. The reference signal along with signals corresponding with the actual and desired positions are compared in a second comparator to produce a second error signal which ultimately causes the robot mechanism to move by the desired amount.

8 Claims, 9 Drawing Figures

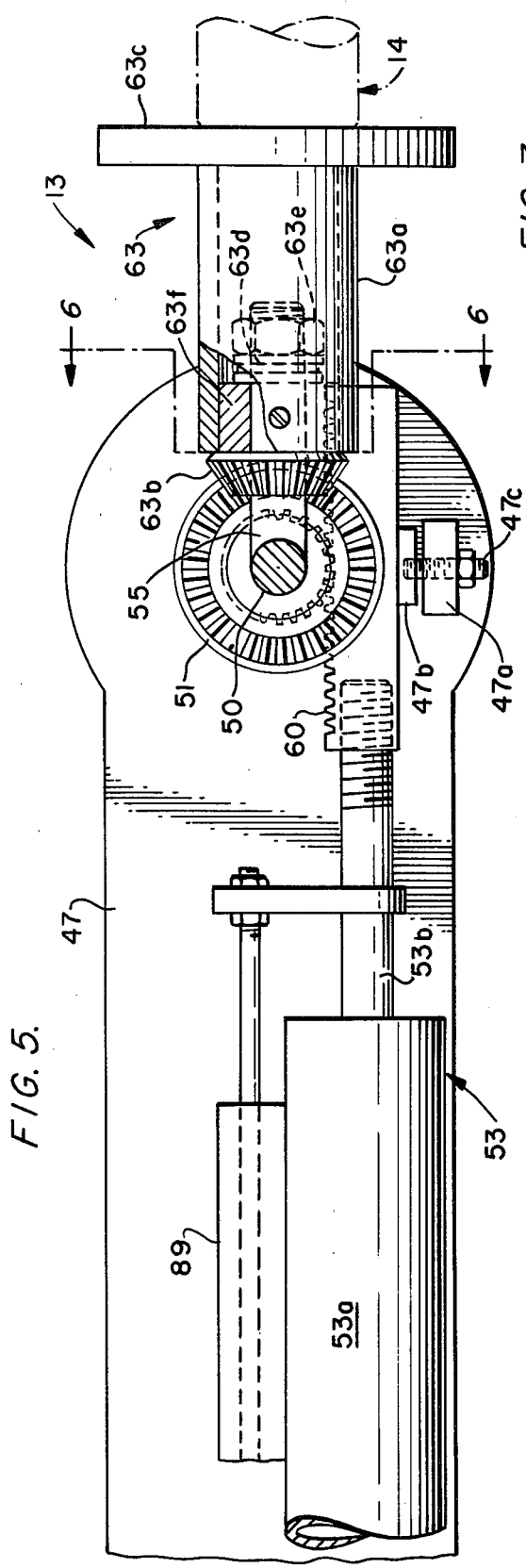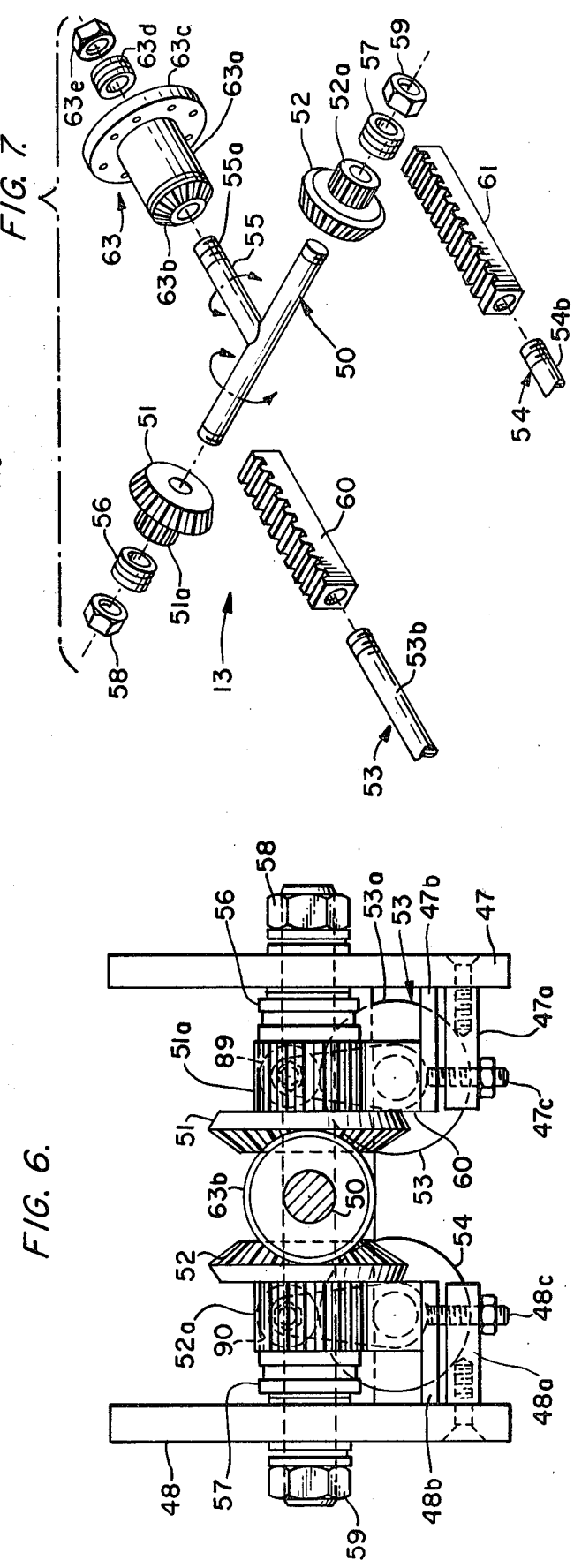

METHOD AND APPARATUS FOR COMPENSATING FOR SYSTEM ERROR IN AN INDUSTRIAL ROBOT CONTROL

BACKGROUND OF THE INVENTION

This invention relates to industrial robots, and more particularly, to control systems for such robots.

In the design and development of industrial robots it has been the primary objective of most robot manufacturers to produce a machine which will most nearly simulate the work function of an individual worker at a cost saving so as to provide improved productivity. Most commercially available robots, however, do not achieve such an objective because they require an initial investment which is too great. Much of this high initial investment is caused by the need to use very high quality electronic and other components in order to insure that as few positioning errors are created by the system itself as possible. That is, in robot systems of the type here in question it is quite possible that the various components used can introduce errors which will cause the actual point in space to which the robot is aimed to differ from the desired point. Should lower quality components be used in most systems the aimed point will differ much more significantly from the desired point than would be the case with the use of higher quality components.

Accordingly, it is an object of the invention to provide improved means and method for controlling industrial robot mechanisms wherein lower cost components can be used, but which provides correction for errors introduced by such components.

Another object of this invention is to provide means and method for continuously correcting positioning errors in industrial robot control systems which errors are introduced by the control system itself.

BRIEF DESCRIPTION OF THE DRAWINGS

The foregoing and other objects and advantages of the invention will become more apparent to those having ordinary skill in the art to which the invention pertains through consideration of the following description taken with the accompanying drawings, wherein:

FIG. 5 is a vertical cross-sectional view of a portion of the upper arm member of the embodiment shown in FIGS. 1 and 2 illustrating the wrist assembly of the embodiment;

FIG. 6 is a cross-sectional view taken along lines 6—6 in FIG. 5;

FIG. 7 is a perspective view of the wrist assembly of the embodiment shown in FIGS. 1 and 2 illustrating the components thereof in exploded view;

DETAILED DESCRIPTION OF A PREFERRED EMBODIMENT

Figure 1:
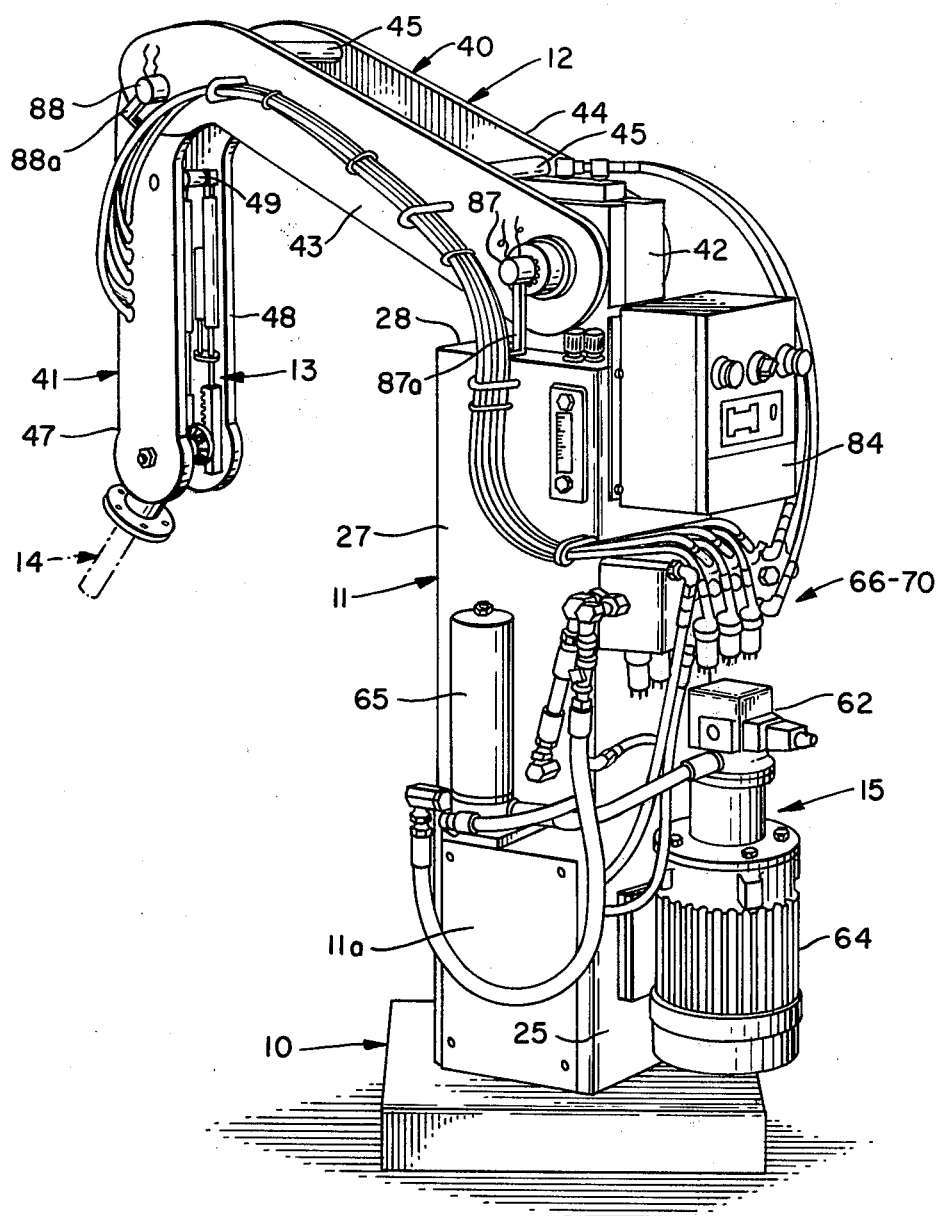
FIG. 1 is a perspective view of an embodiment of an industrial robot illustrating an exemplary environment for the invention principally illustrating the side and rear portion of the robot.
Figure 2:
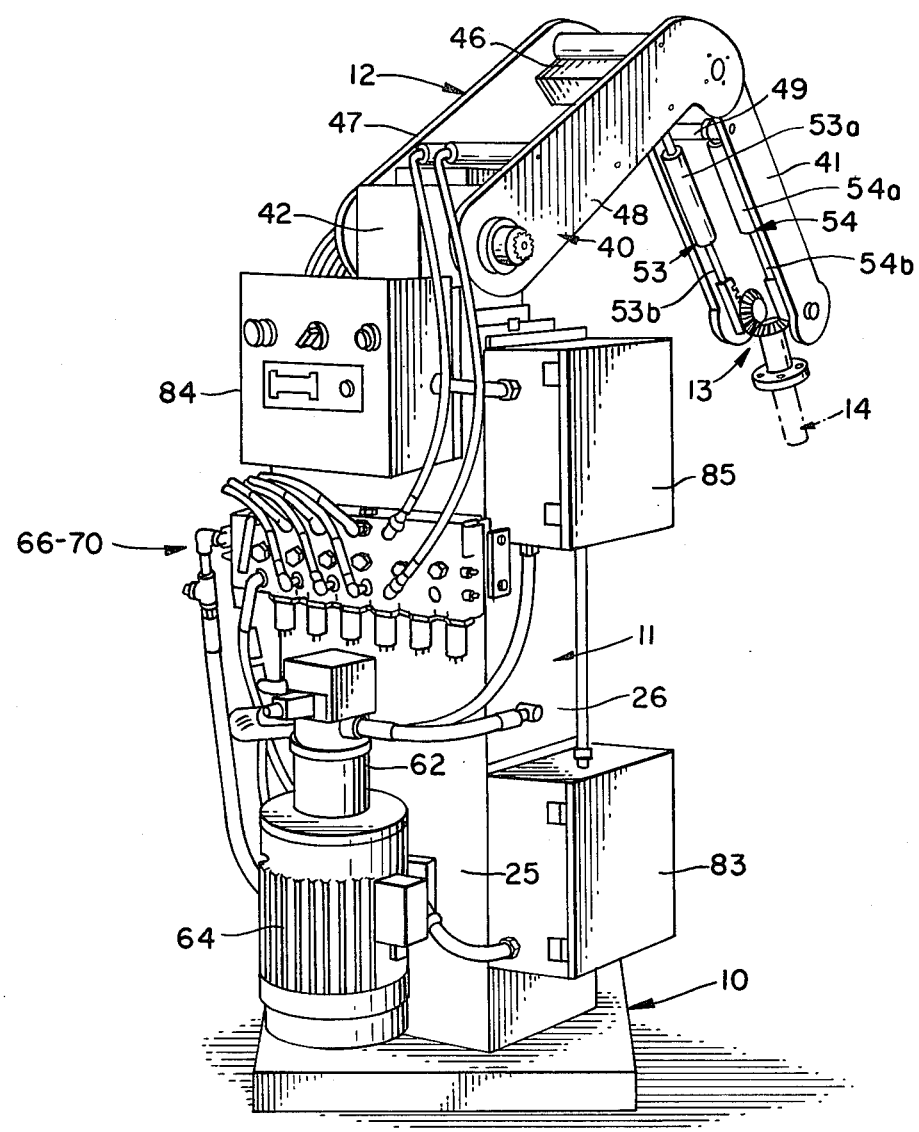
FIG. 2 is a perspective view of an opposite side and rear portion of the FIG. 2 embodiment.

Referring to FIGS. 1 and 2, there is illustrated an industrial robot system for performing a mechanical work function. This illustration provides an example of an environment in which the invention described herein is used. The robot consists of a support base assembly 10, a tank unit 11 is mounted on the support base assembly for rotational movement about a vertical axis, an articulated arm assembly 12 mounted on the upper end of the tank unit, a wrist assembly 13 mounted on the free end of the arm assembly, a work tool 14 mounted on the wrist assembly and an electro-hydraulic system 15 for controlling the rotation of the tank unit about its vertical axis of rotation, the manipulation of the arm assembly and the operation of the wrist assembly for positioning the work tool to perform the desired work function.

Figure 4:
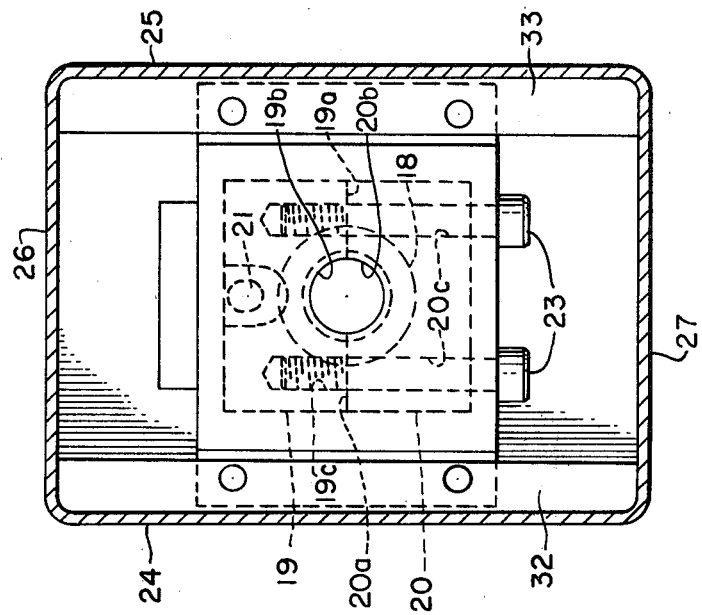
FIG. 4 is a cross-sectional view taken along line 4—4 in FIG. 3.
Figure 3:
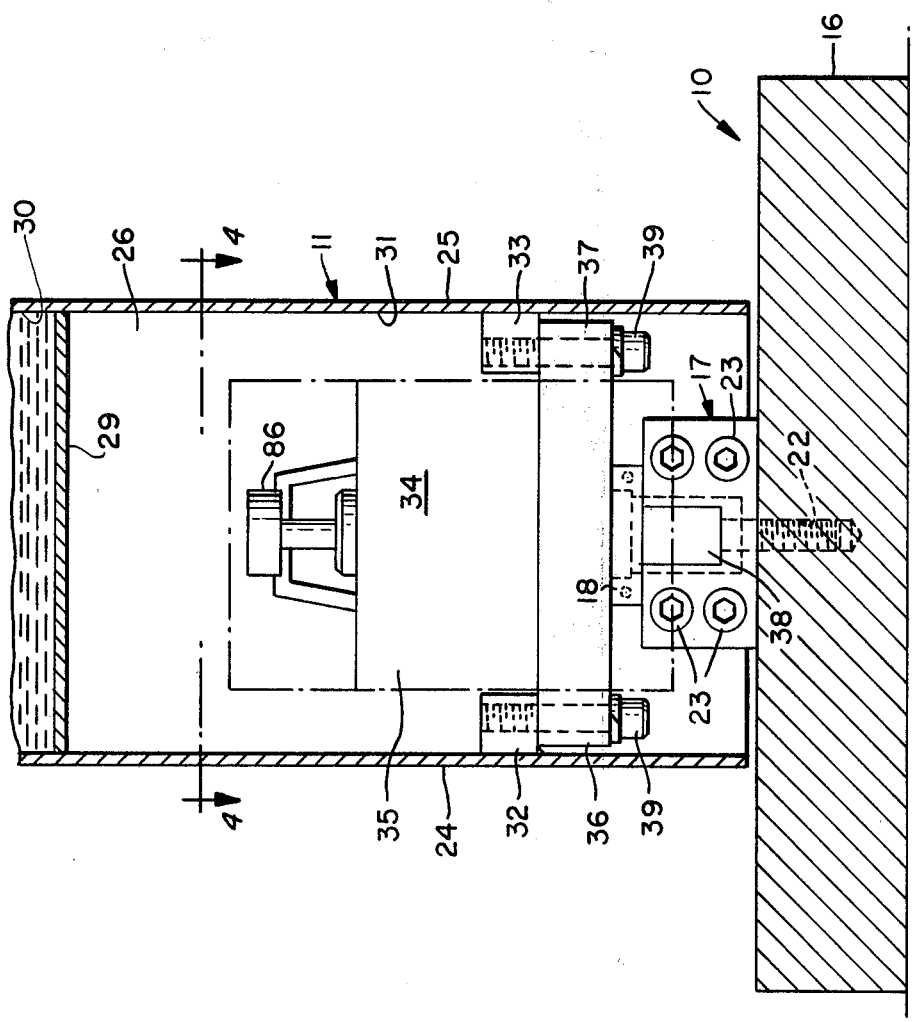
FIG. 3 is an enlarged vertical cross-sectional view of the lower end of the embodiment shown in FIGS. 1 and 2, principally illustrating the support base assembly, the lower end of the tank unit and the mounting of the lower end of the tank unit on the support base assembly.

As best illustrated in FIGS. 3 and 4, the support base assembly consists merely of a base plate 16, a split clamp block 17 and a thrust bearing 18. Base plate 16 may be formed of any heavy material, such as steel, which will provide a good stable base for the machine. To provide increased stability, such member may be provided with bolt holes for bolting the machine to the floor at the desired work station. Split clamp block 17 includes a rigidly mounted block section 19 adapted to be bolted to the base plate, and a detachable block section 20. Block section 19 is rigidly secured to the base plate by means of a bolt 21 extending through a vertical opening in block section 19 and threaded into a threaded hole 22 provided in the base plate. Block section 19 further is provided with a vertical mating surface 19a having a vertically disposed, semi-circular recess 19b and a pair of horizontally disposed, threaded openings 19c. Detachable block section 20 is adapted to be mounted on the base plate and is provided with a vertical mating surface 20a having a vertically disposed, semi-circular recess 20b registrable with recess 19b of block section 19 for receiving therebetween the shaft of a rotary motor as will later be described. Block section 20 further is provided with a set of horizontal bolt openings 20c which are adapted to register with threaded openings 19c of block section 19. Block sections 19 and 20 are adapted to be drawn together to clamp the output shaft of a rotary motor between registered grooves 19b and 20b by means of a set of bolts 23 inserted through bolt holes 20c and threaded into registered threaded openings 19c.

Thrust bearing 18 is adapted to be seated on split clamp block 17 and rigidly secured thereto by bolting or other suitable means. The bearing is provided with an axial opening which is adapted to register with the opening provided by recesses 19b and 20b of the block sections.

Tank unit 11 functions primarily as a post member and includes a pair of front and rear walls 24 and 25, sidewalls 26 and 27, a top wall 28 and a bottom wall 29. As best illustrated in FIG. 3, bottom wall 29 is disposed above the lower edges of front and rear walls 24 and 25 and sidewalls 26 and 27 to provide an upper, closed compartment 30 and a lower compartment 31 opened at the bottom. Compartment 30 is utilized as a hydraulic fluid reservoir for electrohydraulic control system 15.

Referring again to FIGS. 3 and 4, lower compartment 31 is provided with a pair of support strips 32 and 33 which are rigidly secured to front and rear walls 24 and 25 of the tank unit and which function to support a fluid actuated rotary motor 34. The motor includes a housing 35 provided with a set of flanges 36 and 37, and an output shaft 38. The housing is mounted on support strips 32 and 33 by means of a set of bolts 39 which project up through bolt holes in flanges 36 and 37 and are threaded into threaded openings in support strips so that output shaft 38 of motor 34 projects through the opening in thrust bearing 18 and is received within the vertical opening defined by registered recesses 19b and 20b of the clamping block. Output shaft 38 is firmly clamped between registered recesses 19b and 20b by tightening bolts 23. Access to compartment 31 can be had through an opening in sidewall 27 which is provided with an access panel 112. It will be appreciated that by applying fluid under pressure to motor 34 with the output shaft thereof clamped to the support base assembly and the housing thereof clamped to the tank unit, the tank unit will be caused to rotate about its vertical axis of rotation relative to the support base assembly.

Arm assembly 12 generally includes a lower arm member 40 and an upper arm member 41. Lower arm member 40 includes a fluid actuated rotary motor 42 rigidly mounted on upper wall 28 of the tank unit, and a set of side plates 43 and 44. The side plates are spaced apart by means of a set of crosspiece members 45 and are provided at one set of ends thereof with openings for mounting such set of ends on laterally projecting portions of the output shaft of rotary motor 42.

Upper arm member 41 similarly includes a fluid actuated rotary motor 46 and a pair of side plates 47 and 48. One set of ends of side plates 47 and 48 are mounted on sides of rotary motor 46 and are provided with aligned openings therein through which laterally projecting portions of the output shaft of rotary motor 36 project, into aligned openings at the free ends of side plates 43 and 44 of the lower arm member. Side plates 47 and 48 are further maintained in parallel, spaced relation by means of a crosspiece member 49 and a support shaft 50 which is received within a pair of aligned openings at the free ends of said plates 47 and 48, and which supports the wrist assembly, as will later be described. It will be appreciated that by operating rotary motor 42, lower arm member 40 will be caused to pivot about a horizontal axis relative to the tank unit, and by operating rotary motor 46, arm member 41 will be caused to pivot about a horizontal axis relative to lower arm member 40.

Wrist assembly 13 is best illustrated in FIGS. 5 through 5. The assembly includes support shaft 50, a tool mounting unit 63, a set of beveled drive gears 51 and 52 and a set of hydraulic cylinder assemblies 53 and 54. As previously mentioned, support shaft 50 is adapted to be received and mounted in a pair of transversely aligned openings in the free ends of side plates 47 and 48 of the upper arm member. Shaft 50 also is provided with a longitudinally disposed stub shaft 55 provided with a threaded end 55a. Tool mounting unit 63 is adapted to be rotatably mounted on stub shaft 55 and includes a cylindrical section 63a, a beveled driven gear 63b rigidly mounted on an inner end of section 63a and rotatably mounted on stub shaft 55, and a circular mounting plate 63c rigidly mounted on the outer end of cylindrical section 63a. The mounting unit is retained on stub shaft 55 by means of a nut 63c threaded on threaded end portion 55a of stub shaft 55, drawn up against a bushing 63d mounted on stub shaft 55 and engaging an annular collar 63f which is rigidly secured to the inner end of cylindrical section 63a of the mounting unit, as best illustrated in FIG. 5.

Beveled drive gears 51 and 52 are rotatably mounted on support shaft 50 and are provided with integrally formed pinions 51a and 52a, respectively. As best shown in FIG. 6, beveled drive gears 51 and 52 drivingly mesh with beveled driven gear 63b and are maintained in spaced relation from side plates 47 and 48 by means of a pair of bushings 56 and 57 and a set of spacers interposed between pinions 51a and 52a and the adjoining sidewalls of the upper arm member. The support shaft is retained in position by means of a set of bolts 58 and 59 threaded on the ends of support shaft 50 projecting through the transversely aligned openings in the side plates of the upper arm member.

Hydraulic cylinder assemblies 53 and 54 are substantially identical in construction and operation. Hydraulic cylinder assembly 53 includes a cylinder portion 53a mounted on crosspiece member 49 and a rod portion 53b having a rack member 60 mounted on the end thereof which drivingly meshes with pinion 51a. Hydraulic cylinder assembly 54 includes a cylinder portion 54a mounted on crosspiece member 49 and a rod portion 54b having a rack member 61 mounted on the end thereof which drivingly meshes with pinion 52a. Rack member 60 also is supported on a bracket 47a mounted on side plate 47, provided with a wear pad 47b which supports the rack member and which may be adjusted vertically by an adjusting screw 47c. Similarly rack member 61 is supported by a bracket 48a provided with a wear pad 48b which may be adjusted with an adjusting screw 48c. It will be appreciated that by simultaneously extending rod portions 53b and 54b, beveled drive gears 51 and 52 will be caused to rotate in a counterclockwise direction relative to FIG. 5 to pivot mounting unit 63 upwardly about the transverse axis of support shaft 50. Similarly, by simultaneously retracting rod portions 53b and 54b, beveled drive gears 51 and 52 will be caused to rotate in a clockwise direction relative to FIG. 5 to pivot mounting unit 63 downwardly about the transverse axis of support 50. Furthermore, it also will be appreciated that by simultaneously extending one of rod portions 53b and 54b while retracting the other thereof, beveled drive gears 51 and 52 will be caused to rotate in opposite directions to rotate mounting unit 63 about the longitudinal axis of stub shaft 55.

Where rotary motors have been specified for use in rotating the tank unit and pivoting the arm members, it is contemplated that hydraulic cylinder assemblies or comparable actuators also can be used. Similarly, rotary motors and other comparable actuators can be used in lieu of hydraulic cylinder assemblies as herein described.

Figure 8:
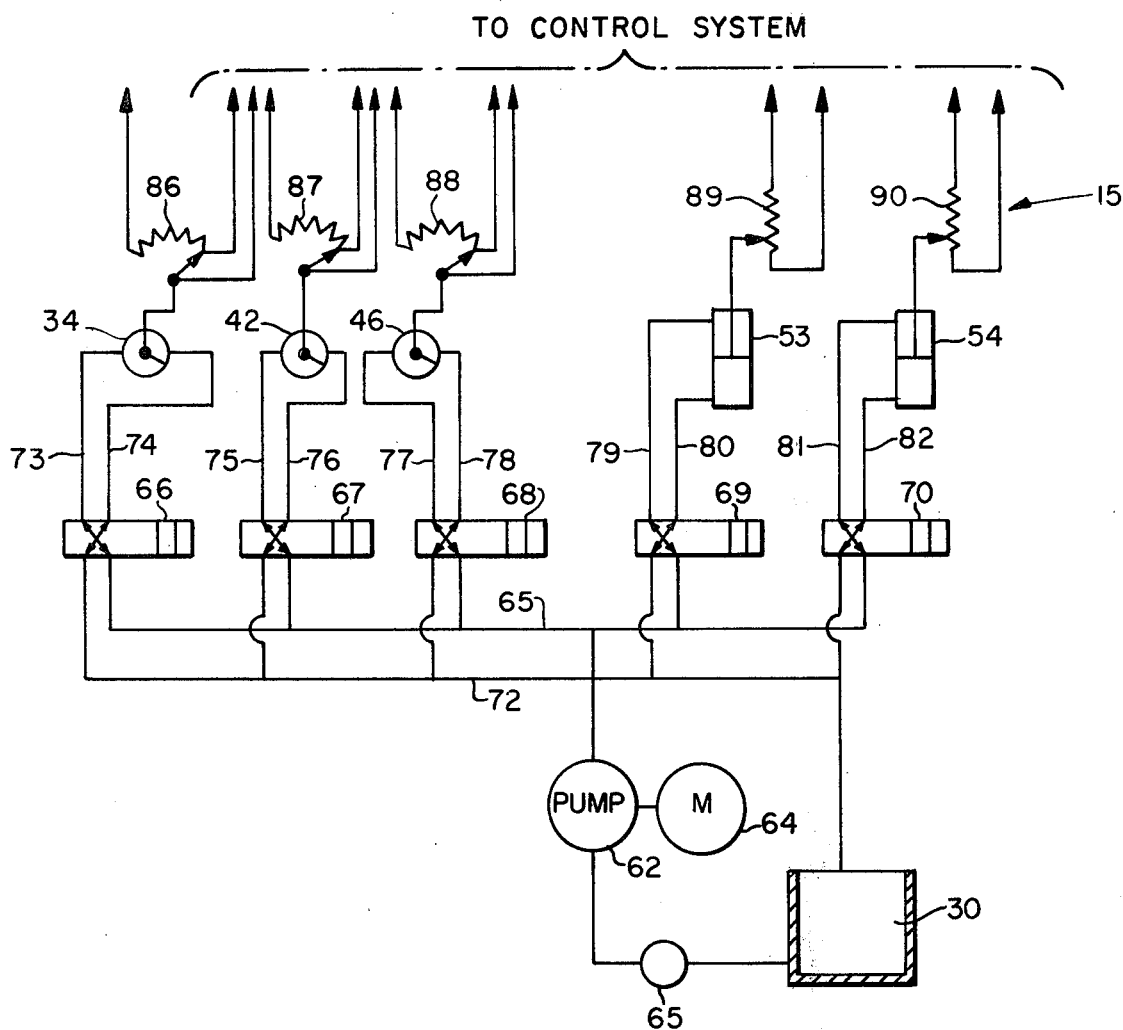
FIG. 8 is a diagrammatic-schematic view of the hydraulic control system for the FIGS. 1 and 2 embodiment and FIG. 9 is a block-schematic view of an electronic control system for the FIG. 1 robot constructed in accordance with the principles of the invention.

The hydraulic portion of the control system is illustrated in FIG. 8 and includes a pump 62 of the variable, pressure-compensated type driven by a motor 64, and an appropriate filter assembly 65. Pump 62 supplies fluid under pressure through a pressure line 65 to a set of two-stage, electro-hydraulic servo-valves 66 through 70. Fluid under reduced pressure also is supplied through pilot lines to the spool ends of valves 66 through 70. Fluid is returned from the control valves to reservoir 30 through a return line 72.

Valve 66 functions to control the operation of rotary motor 34 and is connected thereto by means of a pair of fluid lines 73 and 74. Valve 67 functions to control the operation of lower arm rotary motor 42 and is connected thereto through a pair of fluid lines 75 and 76. Valve 68 functions to control the operation of upper arm rotary motor 46 and is connected thereto by fluid lines 77 and 78. Valves 69 and 70 function to control the operation of cylinder assemblies 53 and 54 of the wrist assembly, and are connected thereto by sets of fluid lines 79 and 80 and 81 and 82, respectively.

Figure 9:
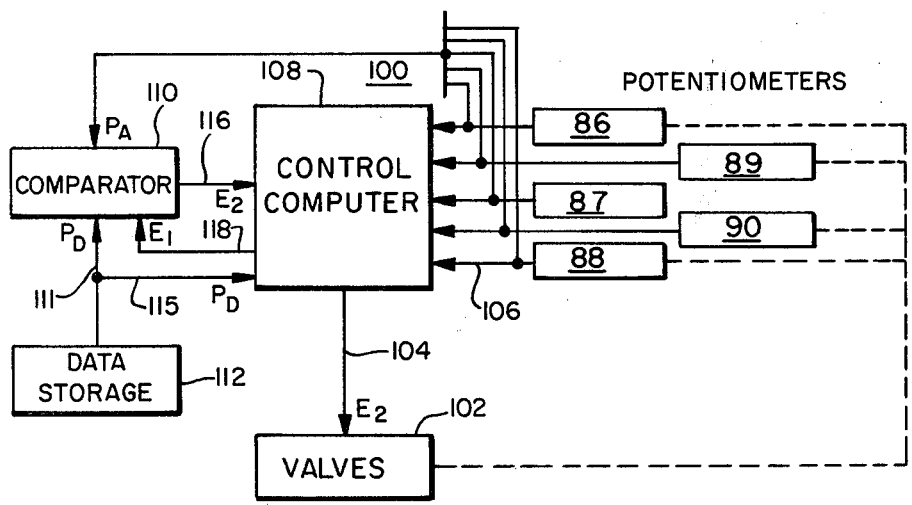

FIG. 9 is a block-schematic diagram illustrating the connected and functional relationships between the various portions of the motive power, hydraulic control and electronic control systems for the described industrial robot.

As illustrated, the robot is caused to move about various of its axes through the operation of hydraulic valves 34, 42, 46, 53 and 54 as described hereinabove. These hydraulic valves form an actuator 102 as schematically illustrated in this figure. The hydraulic valves forming actuator 102 are in fluid communication via the illustrated sets of hydraulic lines with a series of hydraulic servo-valves constituted by valves 66 through 70, and it is these latter valves which operate to control the functions of the various actuating hydraulic valves forming actuator 102.

As pointed out hereinabove, the various servo-valves 66 through 70 are selectively operated by control or command signals issuing from control system 100. These signals are shown schematically in this figure as being supplied over a line 104. As discussed hereinabove, the potentiometers 86 through 90 supply voltage signals which are indicative of the current positions of the various axes of motion of the robot components. These potentiometers or position sensors supply their signals to control system 100 by lines 106 which are branched to supply these signals to control computer 108 through its input/output circuits and to a comparator 110, which in this case is an analog comparator. The signals $P_A$ on line 106 can be utilized in the supplied anglog form by comparator 110, but in the control computer it will be necessary through conventional means to convert these analog signals to digital signals for further processing. An operating data storage 112 receives data corresponding with the desired positions, or the positions it is desired the robot to take during a given operating sequence. Signals corresponding with this data $P_D$ are communicated via lines 111 and 115, respectively, to comparator 110 and control computer 108. Of course, conversion to analog form will be required prior to application of these signals to comparator 110. The data placed in storage 112 can be from any desired source, and for example, can be generated through a lead-through teaching operation as described hereinabove.

Control system 100 operates on the basis of the input operating data it receives and stores in storage 112. It operates to produce control signals which would ultimately in a predetermined operating sequence position the robot at the positions in space indicated by each set of data from each storage location. In order to accomplish this on a "coarse" basis the various position data from storage 112 are communicated to comparator 110 and there compared with the signal corresponding with the actual position of the robot mechanism. An error signal E2 corresponding with the compared result is produced and communicated through the input/output circuits of control computer 108 to line 104 to cause operation of the servo-valves to position the robot. However, this comparison alone will likely produce an error between the point at which the robot will actually aim and the point at which it is desired the robot as indicated by the particular data signal $P_D$ now being operated. In order to compensate for this error a correction factor is introduced in the foregoing comparison.

The correction factor is in the form of an error signal E1 produced by control computer 108 and communicated to an input of comparator 110. This signal has the effect of changing the reference value about which a comparison occurs and thereby compensates for the error it has noted. The signal E1 is produced by control computer 108 on the basis of the values of the current signals $P_D$ and $P_A$ now being operated on. It in effect performs a comparison on a longer time constant basis than the analog comparator and produces an error signal corresponding with the positioning errors occurring in the system. This error-noting comparison is performed continuously throughout the sequence of operations of the robot mechanism, and this first error signal E1 is continuously supplied to comparator 110 to provide the reference or error correction value about which the analog comparison of the signals $P_A$ and $P_D$ occur for operating actuator 102.

In effect the inputs from lines 106 and 111, comparator 110 and the output line 116 form a hardward servo-loop operating on an analog basis. The inputs from lines 106 and 115, control computer 108 and the output therefrom on line 118 form a software servo-loop operating on a digital basis for providing an error signal E1 correcting the operation of the analog servo-loop.

The control computer 108 operates on the basis of a program stored in a program storage (not shown) of conventional structure and arrangement to carry out in the usual manner a series of calculations necessary to utilize the operating data and the signals appearing on line 106 to carry out the operations described hereinabove. The central processor forming the control computer 108 may be structured in the form of a microprocessor known as Zilog model Z80. Data storage 112 can be formed from any practical storage medium for use with the aforementioned microprocessor.

It is to be understood that the description of a preferred embodiment given hereinabove is considered to be only exemplary and that modifications or changes in the described embodiment will occur to those skilled in the art. It is contemplated that such modifications or changes are within the spirit and scope of the invention as defined in the appended claims.

We claim:

1. In a robot mechanism movable in a plurality of axes for moving an implement from point to point or over a predetermined path having means for moving the robot mechanism about its respective motion paths and means for controlling the operations of said moving means, said control means comprising:
   means for sensing the positions of the robot mechanism in each of said motion paths and for producing output signals of corresponding values,
   storage means for storing operating data for a series of movements of the robot mechanism about respective ones of said motion paths in a predetermined sequence, first comparator means for comparing on a motion by motion basis the actual positions of the robot mechanism as determined from said sensing means output signals with, respectively, corresponding desired positions of said robot mechanism as determined from said operating data and producing a first error signal having a value determined by the result of this comparison, second comparator means for comparing on a motion by motion basis the actual positions of the robot mechanism as determined from said sensing means output signals with, respectively, corresponding desired positions of said robot mechanism as determined from said operating data and with said first error signal to produce a second error signal having a value corresponding with the result of this comparison and means for producing command signal to said means for moving to cause the robot mechanism to move about the respective axes and carry out prescribed motions in said predetermined sequence in increments corresponding with the values of said second error signal.

2. The robot mechanism control means defined in claim 1 wherein said second comparator means is constructed to operate with a longer time constant than said first comparator means.

3. The robot mechanism control means defined in claims 1 or 2 wherein said second comparator means is an analog device.

4. The robot mechanism control means defined in claim 3 wherein said first comparator means is a digital data processing means.

5. A method of controlling a robot mechanism movable about a plurality of axes and through a plurality of motions for moving an implement from point to point over a predetermined path and having means for moving the robot mechanism and means for selectively controlling said means for causing the robot mechanism to operate over a predetermined path, comprising the steps of:

storing in prescribed locations of an operating data storage means operating data for a series of movements of the robot mechanism through a predetermined sequence of motions, sensing the positions of the robot mechanism as each prescribed motion is completed and supplying corresponding sensor output signals, comparing on a motion by motion basis the actual positions of the robot mechanism as determined from said sensor output signals with, respectively, corresponding desired positions of said robot mechanism as determined from said operating data and producing a first error signal having a value determined by the result of the comparison, comparing on motion by motion basis the actual positions of the robot mechanism as determined from said sensor output signals with, respectively, corresponding desired positions of said robot mechanism as determined from said operating data and with said first error signal to produce a second error signal having a value corresponding with the result of the comparison and moving the robot mechanism through a predetermined series of motions in increments corresponding with the values of said second error signal.

6. The method defined in claim 5 wherein said first comparison step occurs on a digital basis.

7. The method defined in claim 5 wherein said second comparison occurs on an analog basis.

8. The method defined in claims 6 or 7 wherein said first comparison occurs with a longer time constant than said second comparison.

* * * * *